United States Patent [19]

Asayama

[11] Patent Number: 4,829,964

[45] Date of Patent: May 16, 1989

[54] FLUID PRESSURE REGULATOR

[75] Inventor: Yoshiaki Asayama, Hyogo, Japan

[73] Assignee: Mitsubishi Denki Kabushibi Kaisha, Tokyo, Japan

[21] Appl. No.: 57,079

[22] Filed: Jun. 3, 1987

[30] Foreign Application Priority Data

| Jun. 3, 1986 [JP] | Japan | 61-128610 |
| Jul. 4, 1986 [JP] | Japan | 61-158538 |
| Sep. 30, 1986 [JP] | Japan | 61-233579 |

[51] Int. Cl.$^4$ .............................................. F02M 39/00
[52] U.S. Cl. ..................................... 123/463; 234/458
[58] Field of Search .............. 123/458, 463, 456, 459, 123/462, 457

[56] References Cited

U.S. PATENT DOCUMENTS

| 3,911,884 | 10/1975 | Moriya | 123/458 |
| 4,050,431 | 9/1977 | Jackson | 123/463 |
| 4,184,465 | 1/1980 | Nakazeki | 123/463 |
| 4,200,073 | 4/1980 | Stoltman | 123/458 |
| 4,421,089 | 12/1983 | Moore | 123/458 |
| 4,426,978 | 1/1984 | Sasaki | 123/458 |
| 4,481,926 | 11/1984 | Miki | 123/458 |

FOREIGN PATENT DOCUMENTS

| 0043932 | 3/1984 | Japan | 123/458 |
| 0190444 | 10/1984 | Japan | 123/458 |

Primary Examiner—Carl Stuart Miller
Attorney, Agent, or Firm—Sughrue, Mion, Zinn, Macpeak & Seas

[57] ABSTRACT

A fuel pressure regulating apparatus having a biasing structure including at least two and sometimes three biasing members, at least one of the biasing members being under control of an electromagnet in order to regulate the position of a valve member, which is associated with a diaphragm, with respect to a valve seat 16. The relative position may be regulated in accordance with a number of parameters, including engine temperature. The biasing members act in opposing directions in accordance with an engine operating parameter.

6 Claims, 7 Drawing Sheets

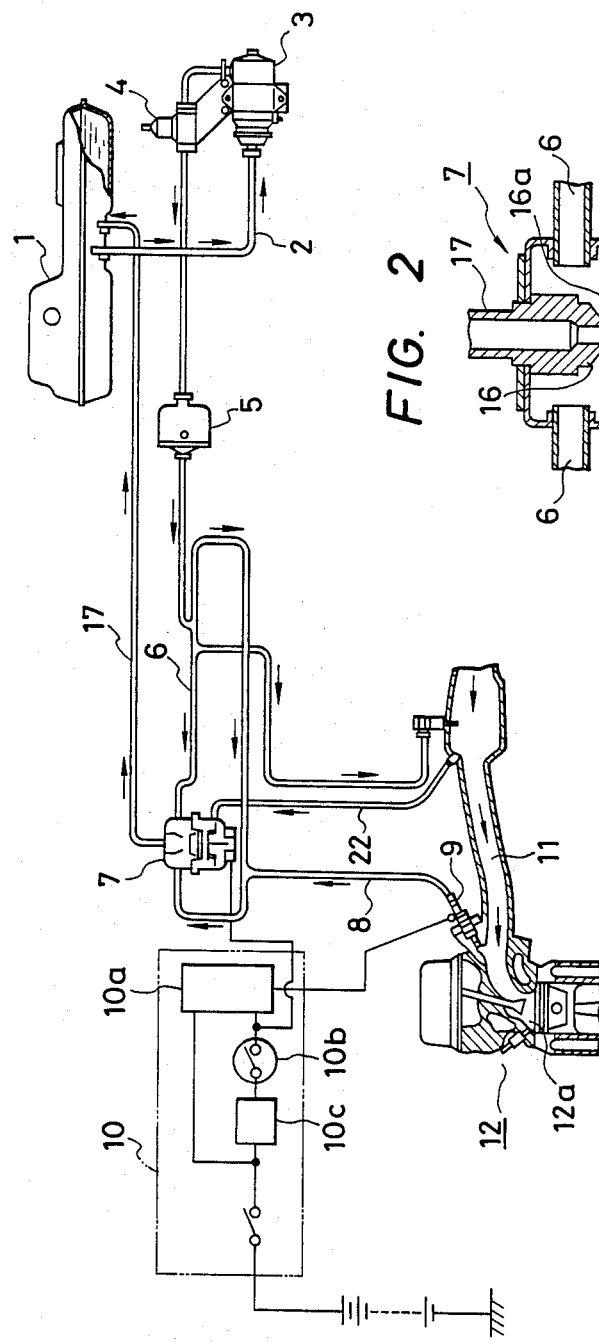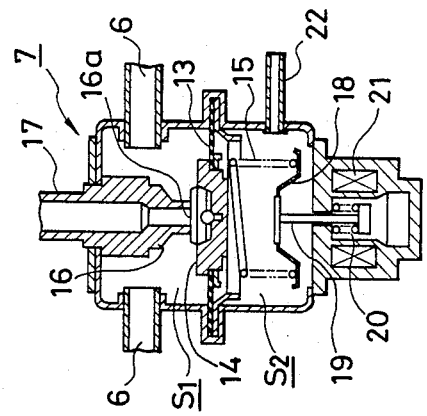
FIG. 1
FIG. 2

FLUID PRESSURE REGULATOR

BACKGROUND OF THE INVENTION

The present invention relates to a fluid pressure regulator for use in, for example, an electronically controlled fuel injection system of an internal combustion engine of an automobile.

An example of a conventional fluid pressure regulation system is disclosed in, for example, Japanese Utility Model Application Laid-Open No. 65945/1984 and Japanese Pat. Application Laid-Open No. 132068/1985.

FIGS. 1 and 2 show the fluid pressure regulator of the latter, schematically. In FIG. 1 which shows a fuel injection system having the fluid pressure regulator and FIG. 2 which shows the fluid pressure regulator in cross section, fuel is routed from a fuel tank 1 through a pipe 2 to a fuel pump 3 in which it is pressurized. Then, it is supplied from the fuel pump 3 through a damper 4, a fuel filter 5 and a pipe 6 to a pressure regulator 7 in which a fuel pressure is regulated to a predetermined value. Fuel at the predetermined pressure is supplied through a pipe 6 to a fuel injector 9 of electromagnetic valve type. The fuel injector 9 shown in FIG. 1 responds to an instruction signal from a control unit 10a of a control mechanism 10 for opening the valve for a predetermined time to inject supplied fuel. The injected fuel is mixed with suction air flowing through an intake manifold 11 and then supplied to a combustion chamber 12a of an internal combustion engine 12 for combustion.

Describing the pressure regulator 7 in more detail with reference to FIG. 2, when a pressure of fuel flown from the pipe 6 into a fuel chamber S1 reaches or exceeds a preset value, a valve member 14 mounted on a diaphragm 13 is moved downwardly against a downward force exerted thereon by a spring 15. Therefore, fuel is allowed to flow through an overflow opening 16a given at a lower end of a valve seat 16 and a return pipe 17 to the fuel tank 1. On the other hand, a resiliency of the spring 15 can be controlled in two steps by an electromagnetic mechanism composed of a retainer 18, a rod 19, a spring 20 and a solenoid 21. That is, during a normal engine operation, the solenoid 21 is deenergized by the control mechanism 10 so that the retainer 18 is moved downwardly to press the valve member 14 with a first resiliency of the spring 15. Therefore, pressure in the fuel chamber S1 is set to a first pressure corresponding to the resiliency of the spring 15.

In a case where the engine 12 is stopped and then restarted while it is still hot, there is fuel vapor in the injector 9 and in the fuel pipes and, thus, an amount of fuel to be injected by the injector 9 becomes smaller than desired, resulting in a vapor-lock phenomenon. In order to prevent this phenomenon from occurring, a fuel temperature is detected by a fuel temperature sensor mounted on the injector 9 and switch 10b. When it reaches or exceeds a predetermined temperature, the solenoid 21 is energized for a time preset by a timer 10c to move the retainer upwardly by a predetermined distance to thereby compress the spring 15 so that the valve member 14 is urged by a second resiliency of the spring 15. Therefore, fuel pressure in the fuel chamber S1 is set to a second value corresponding to the second resiliency of the spring 15. Thus, the fuel pressure at the restarting of the engine while the latter is still hot is regulated to the second pressure which is higher than that during the normal engine operation, so that the occurrence of the vapor-lock is prevented to allow the injector 9 to inject a sufficient amount of fuel to burn.

During the operation of the engine mentioned above, a negative pressure introduced through the intake manifold 11 and a pipe 22 to a negative pressure chamber S2 is assumed as being constant for simplicity of explanation. It should be noted, however, that the negative pressure in the chamber S2 depends upon running condition of the engine 12 and, practically, an urging force of the valve member 14 exerted on the valve seat 16 varies accordingly to regulate the pressure in the fuel chamber S1 so that a difference between the intake air pressure in the intake manifold 11 and the fuel pressure in the injector 9 becomes constant.

In the conventional regulator mentioned above, it is necessary to set the second fuel pressure at a very large value to prevent the vapor-lock at the engine restart while it is still hot. This means that a considerable drive force is required to resist or support the second resiliency of the spring 15 which corresponds to the second fuel pressure, resulting in a large size electromagnetic mechanism.

It is usual that the constant fuel pressure value to be regulated by the conventional device is 2 to 3 $Kg/cm^2$ and so a mounting load of resilient a member which is a product of fuel pressure and a pressure receiving area of the diaphragm is 10 Kg or more. In order to practice this with an electromagnetic device, the latter must be very large in size.

SUMMARY OF THE INVENTION

An object of the present invention is to provide a fluid pressure regulator capable of producing a large variation of fuel pressure without using a large drive force.

The fluid pressure regulator according to an embodiment of the present invention is featured by a valve member provide against an overflow opening of a valve seat provided in the fluid pressure regulating chamber, a first resilient member acting always on either the valve seat or the valve member to resist fluid pressure and a second resilient member acting, while fluid pressure is within a predetermined range, on the valve seat or the valve member to which the first resilient member acts to give an additional fluid pressure.

In the present invention, the urging force exerted on the valve seat or the valve member is varied by the second resilient member acting thereon when the fluid pressure is within the predetermined range. With such construction of the fuel pressure regulator, it becomes possible to provide a compact and inexpensive fuel pressure regulator capable of regulating fuel pressure according to the operating conditions of the internal combustion engine very easily.

BRIEF DESCRIPTION OF THE DRAWINGS

The present invention will be described, in detail, with reference to the accompanying drawings throughout which same or corresponding portions are depicted by same reference numerals, respectively, and in which:

FIG. 1 shows a conventional fuel injection system, schematically;

FIG. 2 is a cross section of a fuel pressure regulator used in the fuel injection system in FIG. 1;

DETAILED DESCRIPTION OF THE PREFERRED EMBODIMENTS

Figure 3:
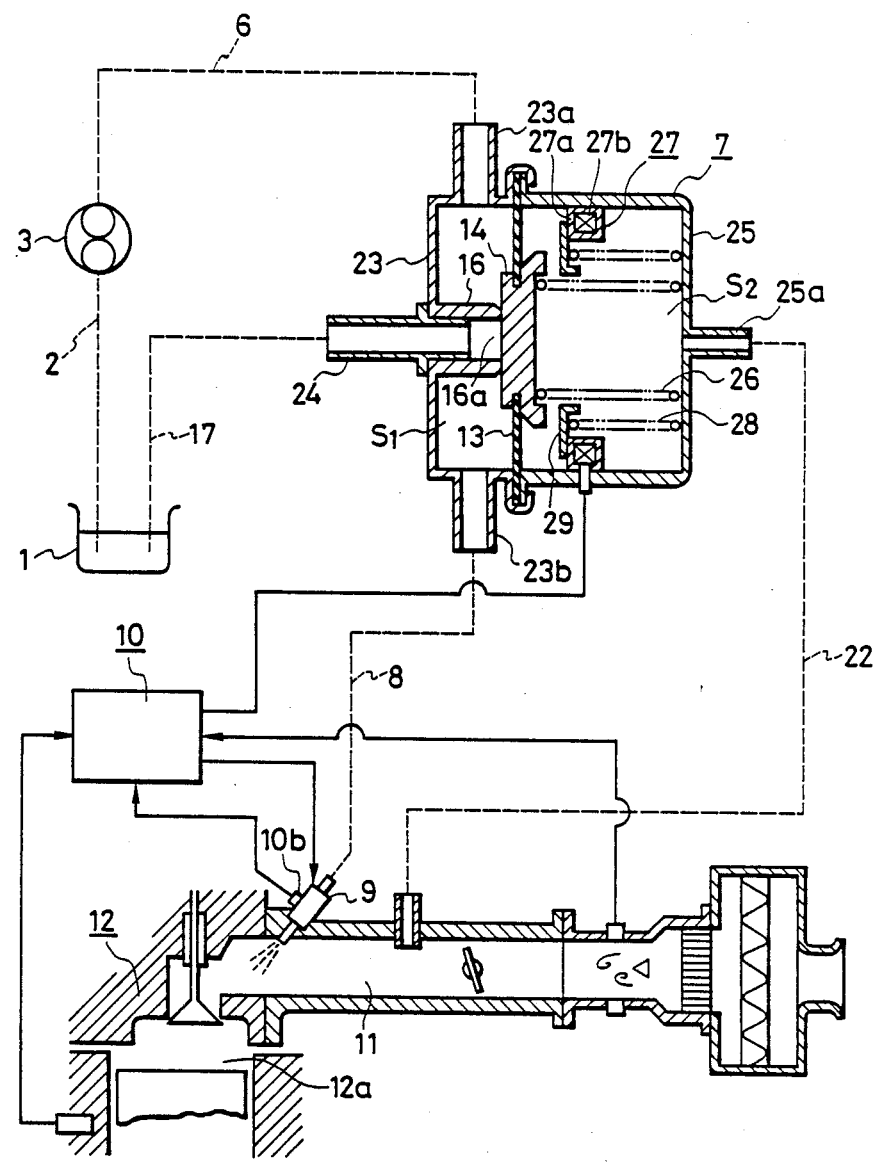
FIG. 3 is a fuel injection system according to an embodiment of the present invention.
Figure 4:
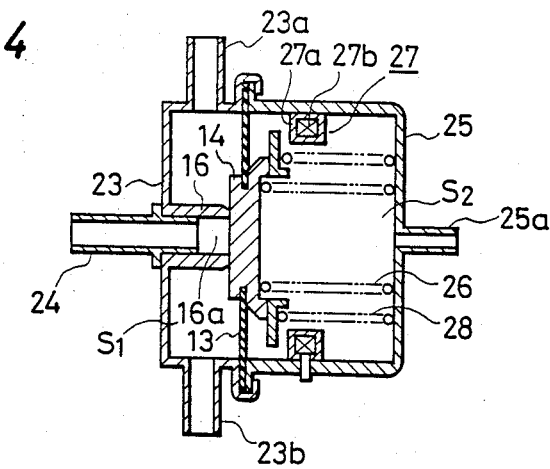
FIG. 4 shows, in cross section, an embodiment of a fluid pressure regulator to be used in the system in FIG. 3.

In FIGS. 3 and 4, an embodiment of the fluid pressure regulator according to the present invention comprises a cylindrical casing 23 having a fuel inlet nipple 23a formed integrally with the casing 23, extending vertically with respect to an axis of the casing 23 and adapted to be connected to a pipe 6 connected to a fuel pump 3, a fuel discharge nipple 23b formed integrally with the casing 23, extending vertically with respect to the same axis and adapted to be connected to a pipe 8, a valve seat 16 extending from a center bottom of the casing 23 inwardly to form an overflow passage 16a at one end opening thereof, an overflow passage nipple 24 pressure-inserted into the other opening of the valve seat 16 and communicated with a pipe 17 connected to a fuel tank 1, a cylindrical cover 25 having a flange to be fixedly secured, together with a periphery of a diaphragm 13, to a flange of the casing 23 and having a negative pressure nipple 25a formed by extending a center bottom thereof outwardly, which is connected to a pipe 22, and a valve member 14 mounted on a center opening of the diaphragm 13 so as to selectively contact with the overflow passage 16a of the valve seat 16 to close the valve. A fuel pressure regulating chamber S1 is defined by the diaphragm 13 and the casing 23 and a negative pressure chamber S2 is defined by the diaphragm 13 and the cover 25.

The fluid pressure regulator further comprises a first resilient member 26 composed of a spring which is held compressed between the diaphragm 13 and the cover 25 by a first resilient force thereof to normally apply an urging force against a fuel pressure in the fuel pressure regulating chamber S1 and an electromagnet 27 fixedly mounted on an inner peripheral surface of the cover 25, which is composed of a core 27a and a coil 27b and selectively energized by a signal from an electronic control device 10.

The pressure regulator further comprises a second resilient member 28 in the form of a spring which acts on the valve member 14 when the fuel pressure in the pressure regulating chamber S1 is within a predetermined range and an annular retainer 29 of a magnetic material which is abutted to a left end of the second resilient member 28 and adapted to be attracted by the electromagnet 27 against the force of the resilient member 28 when the magnet 27 is energized as shown in FIG. 3 and is urged to the valve member 14 by the second resilient member 28 when the magnet 27 is deenergized as shown in FIG. 4.

In operation, fuel from the fuel tank 1 is pressurized by the fuel pump 3 and fed to the pressure regulating chamber S1 of the fluid pressure regulating device 7 in which its pressure is regulated. The pressure regulated fuel is fed to the injector 9 and injected thereby with a valve opening timing and a valve opening time thereof being controlled according to detection signals indicative of operating conditions of the internal combustion engine 12. That is, the overall operation of the system shown in FIG. 3 is substantially the same as that of the conventional system shown in FIG. 1.

Describing the operation of the present system during the normal operation of the internal combustion engine 12, the coil 27b of the fluid pressure regulator 7 is energized by signals from the electronic control device 10, so that the retainer 29 is attracted by the electromagnet 27 and the second resilient member 28 is held compressed in a position shown in FIG. 3 without acting on the valve member 14. The signals are produced by the device 10 according to a fuel temperature, an amount of air and a number of engine revolutions. Since the urging force of the first resilient member 26 is exerted on the valve member 14 against the fuel pressure in the fluid pressure regulating chamber S1, fuel pressure is regulated to a first pressure corresponding to this urging force.

When the engine 12 is restarted while it is still hot, a temperature sensor of the electronic control device 10 detects a temperature of the injector 9 immediately after the engine 12 is restarted and deenergizes the coil 27b of the fluid pressure regulating device 7 for a predetermined time. In this case, the retainer 29 is released from the electromagnet 27 and urged by the second resilient member 28 against the periphery of the valve member 14, as shown in FIG. 4. Therefore, the valve member 14 is urged by both the first and second resilient members 26 and 28 against the overflow opening 16a of the valve seat 16 and thus fuel pressure is regulated to a second value corresponding to a sum of urging forces of the first and second resilient members 26 and 28.

As mentioned, in order to regulate the fuel pressure to the first value, the electromagnetic drive force of the magnet 27 is enough to compress the second resilient member 28 from the position shown in FIG. 4 to the position shown in FIG. 3 and there is no need of additional drive force for regulating the fluid pressure to the second value. Therefore, the drive force of the electromagnet 27 is enough to compress the second resilient member 28 and, if a distance between the positions of the second resilient member 28 shown in FIGS. 3 and 4 is made short enough, the drive force required can be slightly larger than the resilient force of the member 28 in the position shown in FIG. 4. That is, since a component of the urging force to be exerted on the valve member 14 when the fuel pressure is regulated to the second pressure which corresponds to the resilient force to be exerted on the valve member 14 by the first resilient member 26 becomes unnecessary, the drive force of the electromagnet 27 can be smaller correspondingly and thus it is possible to make the latter compact.

Figure 5:
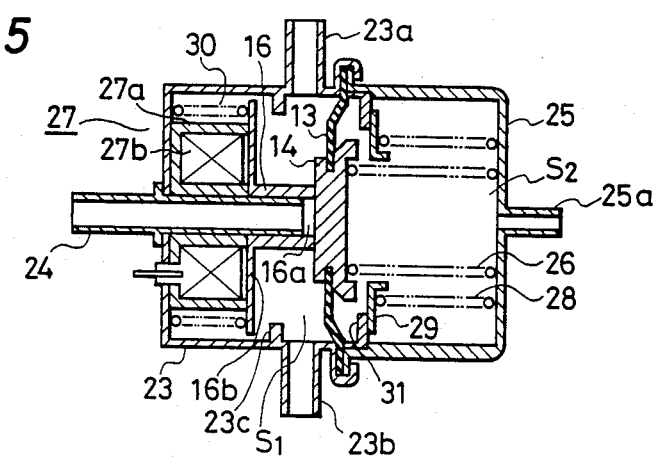
FIGS. 5 and 6 show, in cross section, another embodiment of the fluid pressure regulator of the present invention.
Figure 6:
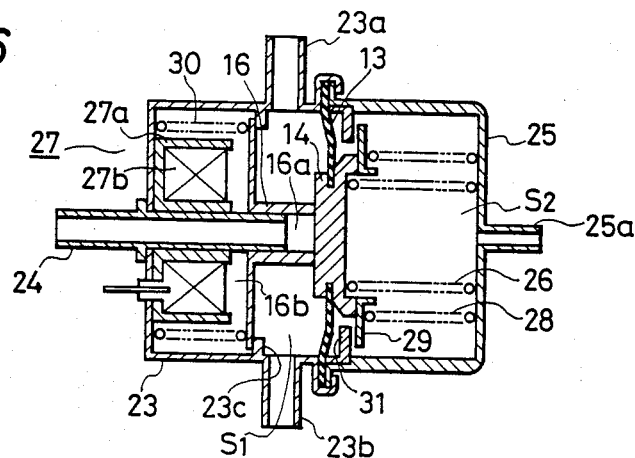

FIGS. 5 and 6 show another embodiment of the present invention which is featured, in addition to those elements of the first embodiment shown in FIGS. 3 and 4, in that the valve seat 16 having a communication hole 16b is mounted slidably on the nipple 24, that a third resilient member 30 is held compressed between the valve seat 16 and the bottom of the casing 23, that the electromagnet 27 which, when energized, attracts the valve seat 16 to a first preset position shown in FIG. 5 is mounted on the bottom of the casing 23 to hold the valve seat 16 against the resilient force of the third resilient member 30, that a stopper member 31 for preventing a retainer 29 of the second resilient member 28 from acting on the valve member 14 is provided on an inner periphery of the flange of the cover member 25 and that another stopper 23c is provided on a inner surface of the casing 23. The stopper 23c is formed integrally with the inner surface of the casing 23 and functions to hold the valve seat 16 urged by the third resilient member 30 when the electromagnet 27 is deenergized in the second preset position shown in FIG. 6.

In this embodiment, during the normal operation of the engine, the electromagnet 27 is energized to hold the valve seat 16 in the first preset position and the valve member 14 is urged by the first resilient member 26 against the overflow passage 16a of the valve seat 16, so that the fuel pressure in the fluid pressure regulating chamber S1 is maintained at the first fuel pressure determined by the resiliency of the first resilient member 26.

On the other hand, at the time of restart of the engine while it is still hot, the electromagnet 27 is deenergized as shown in FIG. 6, so that the valve seat 14 is urged by the third resilient member 30 rightwardly. Therefore, the valve seat 14 receives a pressure of fuel fed thereto in addition to the resilient force of the resilient member 30 and moves rightwardly to the holding member 29 and the valve member 14 compresses the second resilient member 28 until it moves to the second preset position in which the valve seat 16 is brought into contact with the stopper 23c.

As mentioned above, the resiliency of the third resilient member 30 required to move the valve seat 16 from the first preset position to the second preset position when the electromagnet 27 is deenergized may be very small compared with those of the first and second resilient members 26 and 28. That is, since the valve member 14 is substantially balanced by the urging forces of the first and second resilient members 26 and 28 and the fuel pressure when it is moved rightwardly slightly due to the fuel supplied to the fluid pressure regulating chamber S1, the valve seat 16 follows the rightward movement of the valve member 14 with even small resiliency of the third resilient member 30 and continues to move rightwardly with the contacting condition with the valve member 14 being maintained, until it reaches the second preset position.

Therefore, in this embodiment, the drive force to be generated by the electromagnet 27 is enough to attract the valve seat 16 against the small resiliency of the third resilient member 30 and thus the electromagnet 30 in this embodiment may be smaller than that in the embodiment shown in FIGS. 3 and 4.

Figure 7:
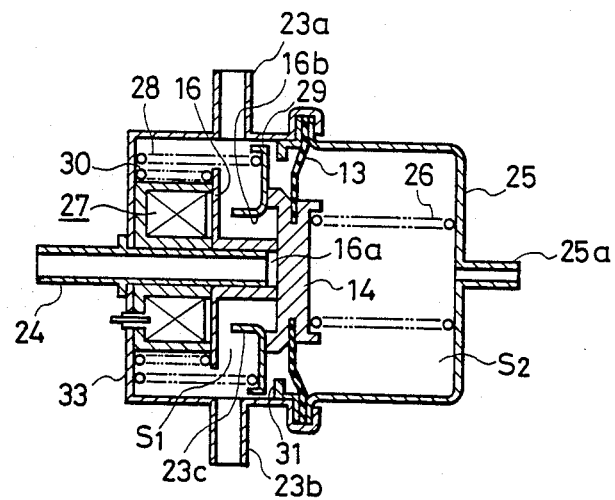
FIGS. 7 and 8 show, in cross section, a further embodiment of the present invention.
Figure 8:
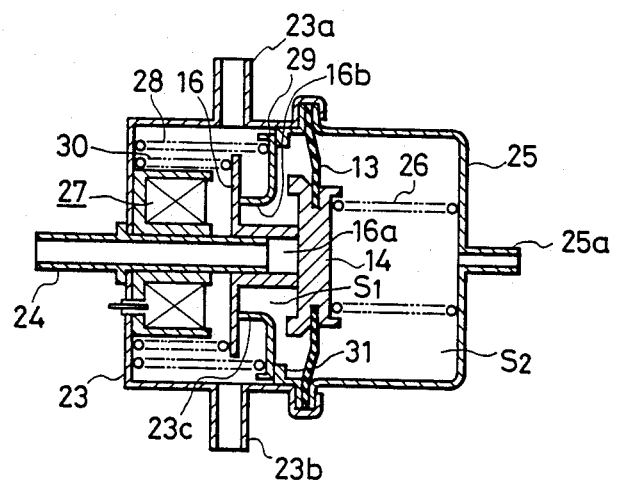

FIGS. 7 and 8 show another embodiment of the present invention, which differs from the embodiment in FIGS. 5 and 6 in that the resiliency of the first resilient member 26 is set as being larger than that of the second resilient member 28 such that, when the valve seat 16 is in the first preset position as shown in FIG. 7, the second resilient member 28 urges the valve member 14 in the opposite direction to the urging direction of the first resilient member 26 so that the valve member 14 is moved by a difference between the resiliency of the first resilient member 26 and that of the second resilient member 28 to regulate the fuel pressure to the first fuel pressure value and, when the valve seat 16 is in the second preset position as shown in FIG. 8, the fuel pressure is regulated to the second fuel pressure value by the urging force exerted on the valve member 14 by the first resilient member 26.

Figure 9:
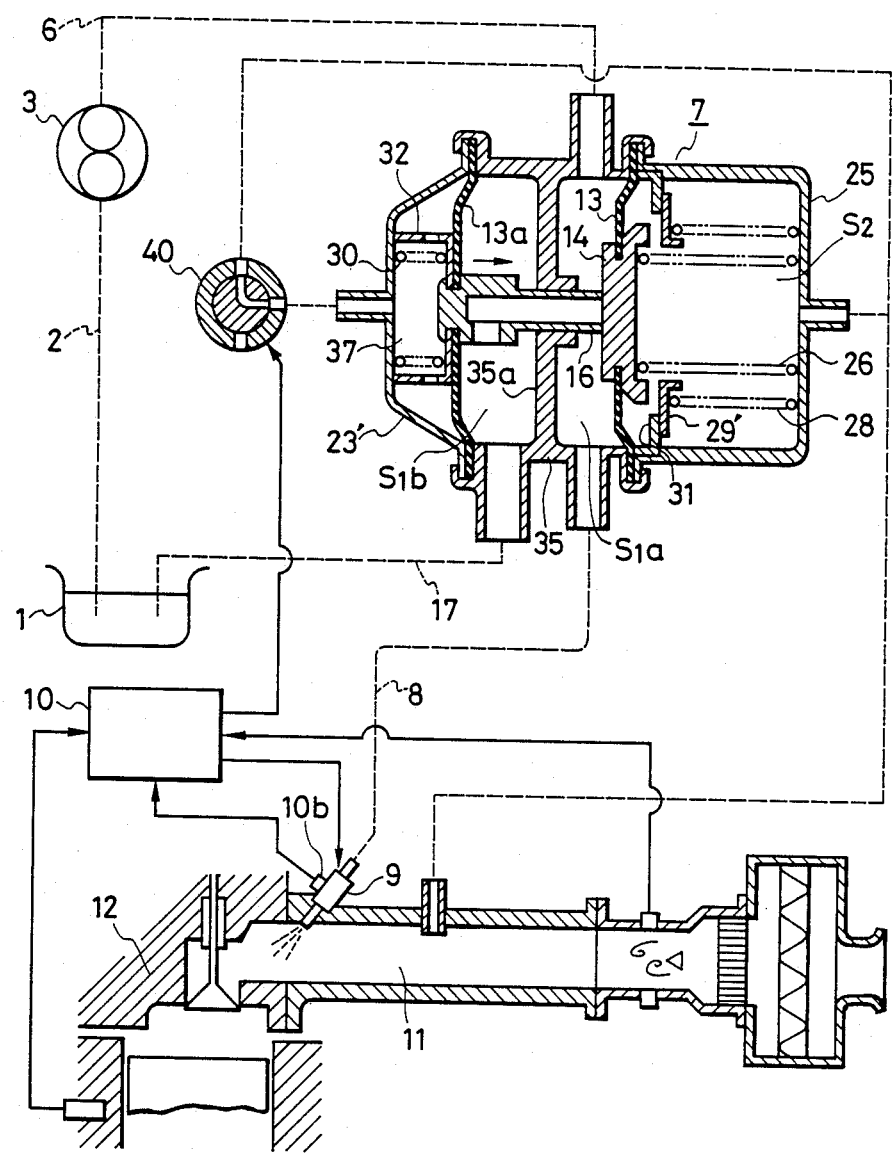
FIGS. 9 and 10 show a still further embodiment of the present invention.
Figure 10:
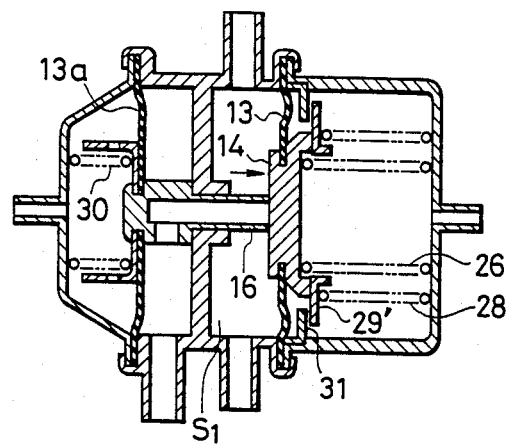

FIGS. 9 and 10 show another embodiment of the present invention. In this embodiment, the fuel pressure regulating device 7 has a partition wall 35 which divides the fluid pressure regulating chamber S1 into two sections S1a and S1b and a second diaphragm 13a which supports a bottom of the valve seat 16. The section S1a is in communication with the fuel pump 33 and the section S1b serves to provide a fluid overflow passage.

The valve seat 16 is slidable through the partition wall 35a and the third resilient member 30 serves to urge the second diaphragm 13a through a stopper 32 in a direction shown by an arrow. The stopper 32 serves to limit an amount of movement of the diaphragm 13a in the reverse direction. An electromagnetic valve 40 is provided which is actuated electrically to introduce a pressure of the suction tube 11 or atmospheric pressure to an air chamber 37 defined by the second diaphragm 13a and a cover member 23'. The electromagnetic valve 40 is controlled in response to the engine operating condition by the controller 10.

An operation of this embodiment in the normal engine operation is the same as that described with reference to the preceding embodiments. As to the operation when the engine is restarted while it is still hot, the sensor 10b detects the engine temperature upon which the electronic controller 10 actuates the electromagnetic switch valve 40 to make the pressure in the air chamber 23' atmospheric. As a result, the second diaphragm 13a moves together with the valve seat 16 in the arrow direction due to the third resilient member 30. Since the valve member 14 is in contact with the valve sea 16 during this movement, the fuel pressure in the chamber S1a increases upon which the first diaphragm 13 moves in an arrow direction shown in FIG. 10. Therefore, the valve seat 16 can be moved with a very small force applied thereto to the position shown in FIG. 10. In this condition, the spring holder 29' is separated from the spring stopper 31 and contacts with the valve member 14. As a result, the second resilient member 28 also affects the valve member 14 jointly to increase the fuel pressure at which the valve member 14 is separated from the valve seat 16 by an amount corresponding to the resilient force of the second resilient member 28. That is the fuel pressure in the chamber S1a is maintained at the second preset value determined by the first and second resilient members 26 and 28.

Figure 12:
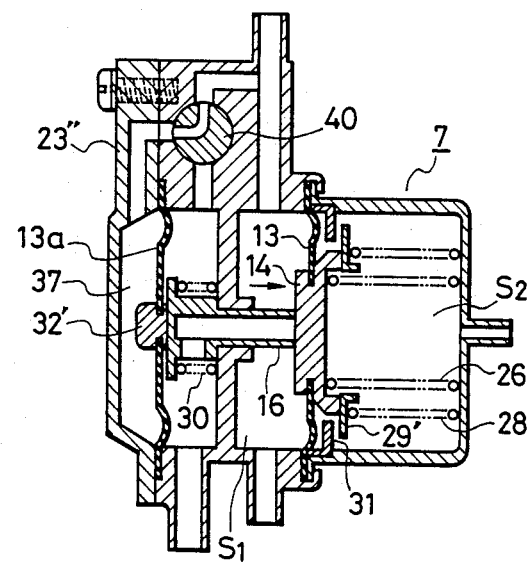
FIG. 12 shows the embodiment in FIG. 11 in the operating state.
Figure 11:
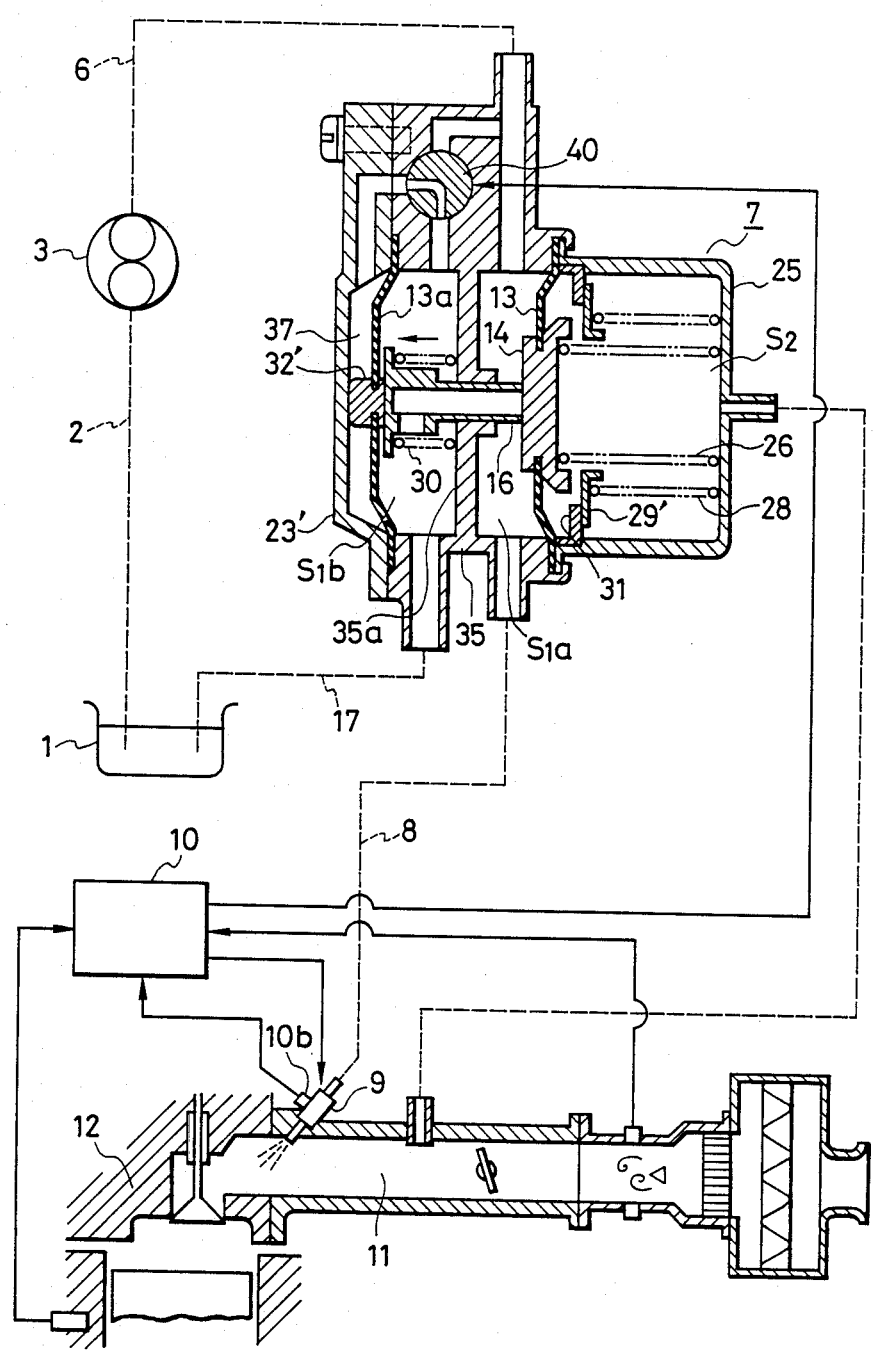
FIG. 11 shows another embodiment of the present invention.

FIGS. 11 and 12 show another embodiment of the present invention which is similar to the embodiment shown in FIGS. 9 and 10 except that the electromagnetic switch valve 40 is provided in the fuel pressure regulator 7 as a unit and the third resilient member 30 urges the second diaphragm 13a in the reverse direction to the case of the preceding embodiment against the pressurized fuel introduced to the chamber 37 through the electromagnetic switch valve 40 as shown in FIG. 11.

The operation of this embodiment in the normal operation of the engine is the same as that in the preceding embodiment. When the engine is restarted while it is still hot, the electronic controller 10 responds to the high temperature detected by the sensor 10b to actuate the electromagnetic switch valve 40 to thereby communicate the chamber 27 with the first chamber S1a as shown in FIG. 12. As a result, the second diaphragm 13a is subjected to the high fuel pressure, so that the valve seat 16 moves against the resilient member 30 in the arrow direction, together with the diaphragm 13a. Since the valve seat 16 is kept in contact with the valve member 14 during this movement, the fuel pressure in the chamber S1a is increased upon which the first diaphragm 13 moves in the arrow direction shown in FIG. 12 by a minimum force applied thereto. Thus, the holding member 29' is separated from the stopper 31 and brought into contact with the valve member 14 to thereby introduce the second resilient member 28 to the valve member 14 so that the fuel pressure at which the valve member 14 is separated from the valve seat 16 is increased by an amount corresponding to the resiliency of the second resilient member 28 and the same effect as that obtained in the preceding embodiment is obtained.

As mentioned hereinbefore, according to the present invention, the fuel pressure regulator comprises a valve member fixedly mounted on a first diaphragm having one surface subjected to pressurized fuel, a plurality of resilient members in the form of springs for biasing the valve member in an opposite direction to the fuel pressure and a cylindrical valve seat and operates such that, when the fuel pressure is within a predetermined range, one of the resilient members affects either the valve seat or valve member which is biased by the other resilient member. Therefore, it becomes possible to vary the fuel pressure considerably with minimum drive force. With a use of a third diaphragm, in addition thereto, it becomes possible to move the valve seat itself.

Although temperature is used as indicative of the engine operating condition on which the second resilient member is brought into operation, any other variable than temperature is also usable for the purpose and, therefore, it should be noted that the engine temperature described is a mere example of the variables.

What is claimed is:

1. A fuel pressure regulator for an internal combustion engine, comprising a first diaphragm, a fuel pressure regulating chamber defined partially by said diaphragm, a valve seat provided in said fuel pressure regulating chamber, said valve seat having an overflow opening, a valve member fixedly mounted on said diaphragm and relatively movable with respect to said valve seat, a first resilient member for biasing said valve member to said valve seat to close said overflow opening thereof, a second resilient member adapted to provide an additional biasing force to said valve member to thereby increase fuel pressure in said fuel pressure regulating chamber when required, and a drive means responsive to an operation condition of said internal combustion engine to selectively bring said second resilient member into operation,, wherein, when the operation condition exceeds a predetermined condition, said drive means causes said second resilient member to exert said additional biasing force on said valve member to increase fuel pressure in said fuel pressure regulating chamber, wherein said valve seat is movable and said drive means comprises an electromagnet fixedly provided in said fuel pressure regulating chamber, a holding member attached to one end of said second resilient member and normally held by a stopper provided on one side of said first diaphragm opposite to said pressure regulating chamber to hold said second resilient member inoperative and a third resilient member provided on the side of said pressure regulating chamber for biasing said valve seat said valve member, said electromagnet being adapted to attract said valve set against resilient force of said third resilient member and to release said valve seat to allow the latter to push said valve member until the latter engages with said holding member to thereby cause said second resilient member to be operative.

2. A fuel pressure regulator for an internal combustion engine, comprising:
a first diaphragm;
a fuel pressure regulating chamber defined partially by said diaphragm;
a valve seat provided in said fuel pressure regulating chamber, said valve seat having an overflow opening;
a second diaphragm on which said valve seat is fixedly supported so as to be movable with said second diaphragm, said pressure regulating chamber being defined between said first and second diaphragms;
a valve member fixedly mounted on said first diaphragm and relatively movable with respect to said valve seat;
a first resilient member for biasing said valve member to said valve seat to close said overflow opening thereof;
a second resilient member adapted to provide an additional biasing force to said valve member to thereby increase fuel pressure in said fuel pressure regulating chamber when required; and
drive means, responsive to an operation condition of said internal combustion engine, for selectively bringing said second resilient member int operation, said drive means comprising an electromagnetic switch valve for selectively supplying a pressure to said second diaphragm to bias the latter toward said first diaphragm;
wherein, when the operation condition exceeds a predetermined condition, said drive means causes said second resilient member to exert said additional biasing force on said valve member to increase fuel pressure in said fuel pressure regulating chamber.

3. The fuel pressure regulator as claimed in claim 2, further comprising a third resilient member for biasing said second diaphragm toward said first diaphragm.

4. The fuel pressure regulator as claimed in claim 2, further comprising a third resilient member for biasing said second diaphragm away from said first diaphragm.

5. A fluid pressure regulator comprising:
a valve seat provided in a fluid pressure regulating chamber and communicated externally of said fluid pressure regulating chamber;
valve member provided in facing relation to an overflow opening of said valve seat;
a first resilient member acting on either of said valve seat and said valve member for biasing said either member against a fluid pressure in a direction to open said overflow opening;
a second resilient member acting on said either member only when said fluid pressure is within a predetermined range, wherein said second resilient member acts on said either member in the same direction as that in which said first resilient acts on said either member, wherein said valve seat is movable between first and second predetermined positions and said second resilient member acts on said valve member only when said valve seat is in either of said first and second predetermined positions;
a third resilient member for moving said valve seat to said second predetermined position;
a holding member for holding said valve seat; and an electromagnet for moving said valve seat to said first predetermined position against said third resilient member.

6. A fluid pressure regulator, comprising:
a valve seat provided in a fluid pressure regulating chamber and communicated externally of said fluid pressure regulating chamber;
a valve member provided in facing relation to an overflow opening of said valve seat;
a first resilient member acting on either of said valve seat and said valve member for biasing said either member against a fluid pressure in a direction to open said overflow opening;
a second resilient member acting on said either member only when said fluid pressure is within a predetermined range, wherein said second resilient member acts on said either member in an opposite direction to that said first resilient member acts on said either member, wherein said valve seat is movable between first and second predetermined positions and said second resilient member acts on said valve member only when said valve seat is in either of said first and second predetermined positions;
a third resilient member for moving said valve seat to said second predetermined position;
a holding member for holding said valve seat; and
an electromagnet for moving said valve seat to said first predetermined position against said third resilient member.

* * * * *